(Model.)

2 Sheets—Sheet 1.

W. R. HAMBLETON.
SELF OPENING GATE.

No. 258,750. Patented May 30, 1882.

Witnesses.
W. W. Mortimer,
W. H. Kern

Inventor.
W. R. Hambleton,
per
F. A. Lehmann,
Atty.

N. PETERS, Photo-Lithographer, Washington, D. C.

(Model.)
2 Sheets—Sheet 2.
W. R. HAMBLETON.
SELF OPENING GATE.
No. 258,750.
Patented May 30, 1882.
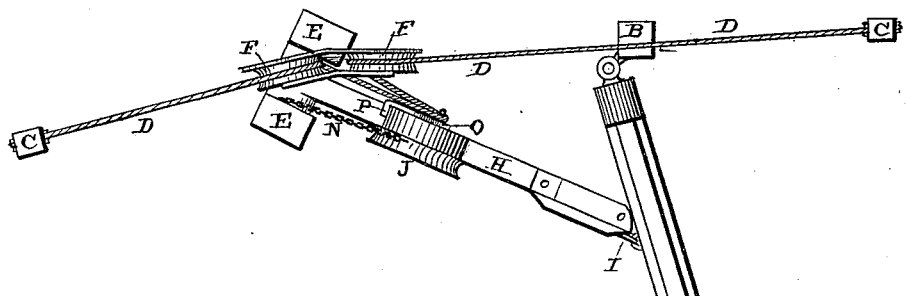
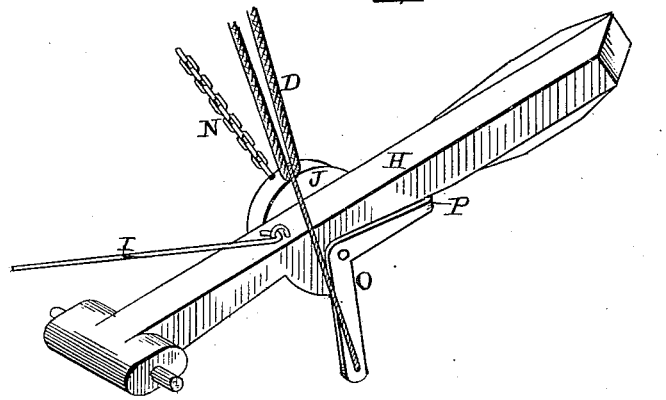
Witnesses:
W. W. Mortimer.
W. H. Kern
Inventor:
W. R. Hambleton
per
F. A. Lehmann,
Att'y
N. PETERS, Photo-Lithographer, Washington, D. C.

UNITED STATES PATENT OFFICE.

WILLIAM R. HAMBLETON, OF WINCHESTER, ILLINOIS.

SELF-OPENING GATE.

SPECIFICATION forming part of Letters Patent No. 258,750, dated May 30, 1882.

Application filed April 4, 1882. (Model.)

*To all whom it may concern:*

Be it known that I, W. R. HAMBLETON, of Winchester, in the county of Scott and State of Illinois, have invented certain new and useful Improvements in Self-Opening Gates; and I do declare the following to be a full, clear, and exact description of the invention, such as will enable others skilled in the art to which it pertains to make and use it, reference being had to the accompanying drawings, which form a part of this specification.

My invention relates to an improvement in self-opening gates; and it consists in the combination of a weighted lever, which is pivoted at its lower end upon one side of the gate and connected to the gate by a suitable rod, for the purpose of pushing the gate open and drawing it shut, and to which lever there is connected a pivoted arm, to which are fastened the two operating-cords, which pass up over pulleys and out beyond opposite sides of the gate, all of which will be more fully described hereinafter.

The object of my invention is to provide a means for opening and closing gates, so that persons in approaching the gate, either in a vehicle, on horseback, or on foot, have only to pull upon one of the cords and the gate will open before them.

Figure 1:
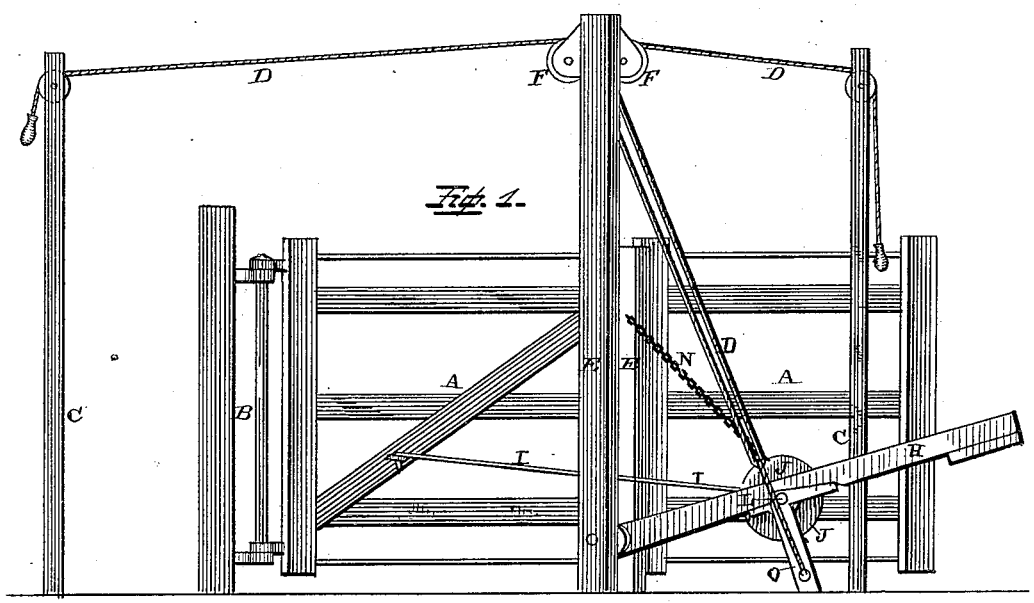
Figure 2:
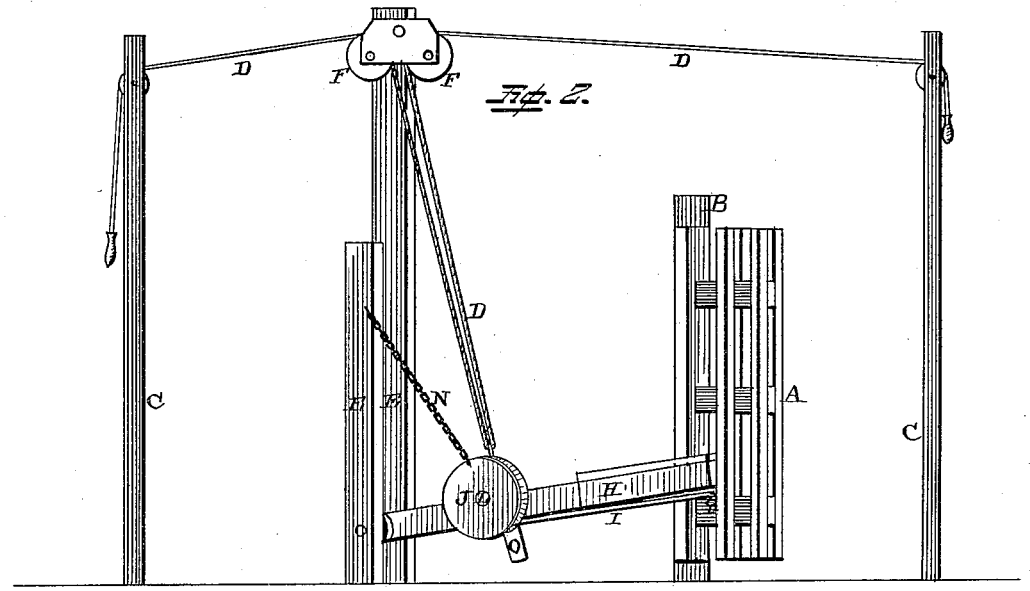

Figure 1 is a side elevation of my invention, showing the gate closed. Fig. 2 is a view taken from the opposite side, showing the gate closed. Fig. 3 is a plan view of the gate. Fig. 4 is a detail view.

A represents the gate, and B the post to which it is hinged. Placed upon opposite sides of the gate are the posts C, through the upper ends of which pass the operating cords, wires, ropes, or chains D in the usual manner. As this gate is intended to open only in one direction, one of these posts is placed much nearer to the gate than the other, as shown. Between the gate and the post C, which is placed farthest from the gate, are the two uprights or standards E, one of which is suitably higher than the other, and which serves as a support for the two pulleys F, over which the operating-cords pass. Pivoted between the posts E, at any suitable distance above the ground, is the lever H, which is weighted at its upper end, and which is connected to the gate by the rod I. As this lever swings back and forth upon its pivot, this rod is made to move the gate in the same direction as the one in which the lever is moving, and thus to open and close the gate. The gate requires no latch for the purpose of holding it shut, because when the gate is closed the free end of the lever bears against it, so as to form a brace, which will hold it closed under any and all circumstances. Journaled upon one side of the lever, a suitable distance above its pivot, is the grooved pulley J, which is rigidly fastened to the pivotal rod L, which passes through the lever, and to which pulley is fastened the operating-chain N. This chain is made too short to follow the lever the entire distance through which it moves, and hence, after the lever is moved a short distance, it directs a positive pull upon the pulley, so as to cause it to turn backward, and in turning backward to turn the pivotal rod to which it is secured. Fastened to the other end of the pivotal rod, upon the opposite side of the lever, is the cranked arm or lever O, which acts as a stop-cock to prevent the lever from moving beyond a certain point. The operating-cords D are fastened to one end of this arm O, and this end projects straight outward; but the point of the other end is turned inward, as at P, so as to catch over the side of the weighted lever as it moves back and forth. The outer end of this arm, to which the cords are attached, can only move a certain distance until the bent end P catches against the side of the weighted lever and is prevented from moving any farther; but when a pull is exerted upon one of the cords D this arm acts as a lever for starting the weighted lever in its upward motion. Although the arm is pivoted, as shown, it forms a rigid arm, because of its inner end catching against the inner edge of the lever, until the lever has reached that point where its weighted end will carry it over past the center by its own momentum, and then the arm is turned upon its pivot by the pulley, so as to let the lever move on past the center, and the bent end shifts from its bearing-point against one place upon the lever through half a circle, and bears upon the lever at another point.

The chain and the pulley serve as a stop to prevent the weighted lever from moving too far in either direction, and just as the lever is reaching the end of its movement the pulley is caused to turn, and in turning it shifts the pivoted arm, so that it is always automatically turned, so as to be in a proper position to exert the best possible lifting force upon the lever.

Having thus described my invention, I claim—

1. The combination of the hinged gate, the connecting-cords D, the standard or standards E, provided with guides for the cords to pass over, a pivoted lever which is connected by a rod, a chain, and pulley, and a pivoted rod having one of its ends bent so as to catch over the side of the lever, substantially as set forth.

2. The combination of the lever, which is connected to the gate by a rod, a rod or shaft which is journaled upon the lever, and which has a pulley rigidly secured at one end and a bent lever at the other, the pulley having a chain secured to it for regulating the distance the lever shall move, and the bent arm or lever having the operating-cords secured to it, substantially as specified.

In testimony whereof I affix my signature in presence of two witnesses.

WILLIAM R. HAMBLETON.

Witnesses:
D. J. KIRKMAN,
P. P. CLARKSON.